(12) United States Patent
Sawyers (10) Patent No.: US 9,397,503 B2
(45) Date of Patent: Jul. 19, 2016

(54) PROVIDING POWER IN AN ELECTRONIC DEVICE

(75) Inventor: Thomas P. Sawyers, Hempstead, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 427 days.

(21) Appl. No.: 13/985,772

(22) PCT Filed: Feb. 16, 2011

(86) PCT No.: PCT/US2011/025020
§ 371 (c)(1),
(2), (4) Date: Aug. 15, 2013

(87) PCT Pub. No.: WO2012/112147
PCT Pub. Date: Aug. 23, 2012

(65) Prior Publication Data
US 2013/0320769 A1    Dec. 5, 2013

(51) Int. Cl.
*H02J 1/00*    (2006.01)
*H02J 3/00*    (2006.01)
*H02J 4/00*    (2006.01)
*G06F 1/26*    (2006.01)
*G06F 1/28*    (2006.01)

(52) U.S. Cl.
CPC . *H02J 4/00* (2013.01); *G06F 1/263* (2013.01); *G06F 1/28* (2013.01); *Y10T 307/696* (2015.04)

(58) Field of Classification Search
CPC ................ H02J 4/00; H02J 1/00; H02J 1/10; H02J 3/38; H02J 1/102; H02J 3/383; H02J 7/0068; H02J 3/46; H02J 3/32; H02J 7/0024; H02J 7/0063; H02J 7/34; H02J 7/35; H02J 9/062; H02J 2001/106; H02J 3/00

USPC .......................................................... 307/80
See application file for complete search history.

(56) References Cited

U.S. PATENT DOCUMENTS

| 5,689,412 | A | 11/1997 | Chen | |
| 6,343,026 | B1* | 1/2002 | Perry | H02M 3/285 323/272 |
| 7,424,626 | B2 | 9/2008 | Vanzante | |
| 7,541,776 | B2 | 6/2009 | Tupman et al. | |
| 7,612,469 | B2* | 11/2009 | Kuo | H02J 9/06 307/64 |
| 7,616,462 | B2* | 11/2009 | Millner | H02M 7/53871 363/132 |

(Continued)

FOREIGN PATENT DOCUMENTS

| KR | 2003-0005962 | 1/2003 |
| WO | WO-2006/130877 | 12/2006 |
| WO | WO-2012/050564 A1 | 4/2012 |

OTHER PUBLICATIONS

International Search Report and Written Opinion, Appln No. PCT/US2011/025020, date of mailing Sep. 27, 2011, 8 p.

*Primary Examiner* — Jared Fureman
*Assistant Examiner* — Esayas Yeshaw
(74) *Attorney, Agent, or Firm* — Trop, Pruner & Hu (57) ABSTRACT

To provide power to an electronic device, converter circuits include a first converter circuit having an input connected to a first power source, and a second converter circuit having an input connected to a second, different power source. A controller determines whether an overload condition of the first power source exists. In response to determining that the overload condition exists, the first and second converter circuits are activated.

13 Claims, 5 Drawing Sheets

(56) References Cited

U.S. PATENT DOCUMENTS

| | | |
|---|---|---|
| 7,688,021 B2 * | 3/2010 | Freiman ............... H02J 7/0068 307/44 |
| 8,253,277 B2 * | 8/2012 | Lin ....................... H02J 1/108 307/43 |
| 2005/0050187 A1 | 3/2005 | Freimuth et al. |
| 2005/0117376 A1 * | 6/2005 | Wilson .................... G06F 1/263 363/142 |
| 2005/0242786 A1 | 11/2005 | Sawyers et al. |
| 2006/0187689 A1 | 8/2006 | Hartular |
| 2006/0273250 A1 | 12/2006 | Amemiya et al. |
| 2006/0277420 A1 | 12/2006 | Nguyen |
| 2007/0079153 A1 | 4/2007 | Bain et al. |
| 2007/0080666 A1 * | 4/2007 | Ritter ....................... H02J 3/32 320/128 |
| 2008/0238209 A1 * | 10/2008 | Kimura .................. H02J 1/102 307/80 |
| 2009/0026843 A1 | 1/2009 | Youn et al. |
| 2009/0061957 A1 | 3/2009 | Bauman |
| 2010/0049994 A1 | 2/2010 | Ghoshal |
| 2012/0049637 A1 * | 3/2012 | Teichmann ............... H02J 3/26 307/82 |

* cited by examiner

PROVIDING POWER IN AN ELECTRONIC DEVICE

BACKGROUND

An electronic device (such as a notebook computer, personal digital assistant, media player, etc.) typically has two alternative power sources: an external power source and an internal battery. The external power source is typically in the form of an AC-DC adapter that plugs into an AC outlet and converts an AC voltage to a DC voltage. When the AC-DC adapter is unplugged from the AC outlet or not connected to the electronic device, power to the electronic device is provided by the battery if the battery has sufficient charge.

BRIEF DESCRIPTION OF THE DRAWINGS

Some embodiments are described with respect to the following figures.

DETAILED DESCRIPTION

An electronic device can have multiple alternative power sources for providing power to the components of the electronic device. A first power source can be an AC-DC adapter, while a second power source can be a battery, as examples. When the AC-DC adapter is disconnected (unplugged from an AC outlet or disconnected from the electronic device), power to the components of the electronic device are provided by the battery. On the other hand, when the AC-DC adapter is plugged into an AC outlet and connected to the electronic device, then power to the electronic device components is provided by the AC-DC adapter; in addition, the power from the AC-DC adapter can also be used to recharge the battery.

When multiple electronic device components are activated simultaneously or close in time to each other, a temporary overload condition of the AC-DC adapter can occur. The AC-DC adapter is in the overload condition when the components of the electronic device attempt to draw more power than the AC-DC adapter is rated to supply. Such a temporary overload condition can cause the AC-DC adapter to overheat and/or to shut down, which can cause damage to the AC-DC adapter or interruption of availability of the electronic device. Moreover, if the average power drawn from the AC-DC adapter over some predefined time interval exceeds the rating of the AC-DC adapter, then that may be considered a violation of government safety regulations. Attempting to address the possible overload condition by using a more powerful AC-DC adapter results in use of a more costly AC-DC adapter—a more powerful AC-DC adapter can also be bigger and heavier.

In accordance with some implementations, in an electronic device that uses a first power source (e.g., an AC-DC adapter or other power source) and a second power source (e.g., a battery or other power source), when an overload condition of the first power source is detected, the second power source can be used to provide supplemental power to avoid or reduce the overload condition of the first power source.

Figure 1:
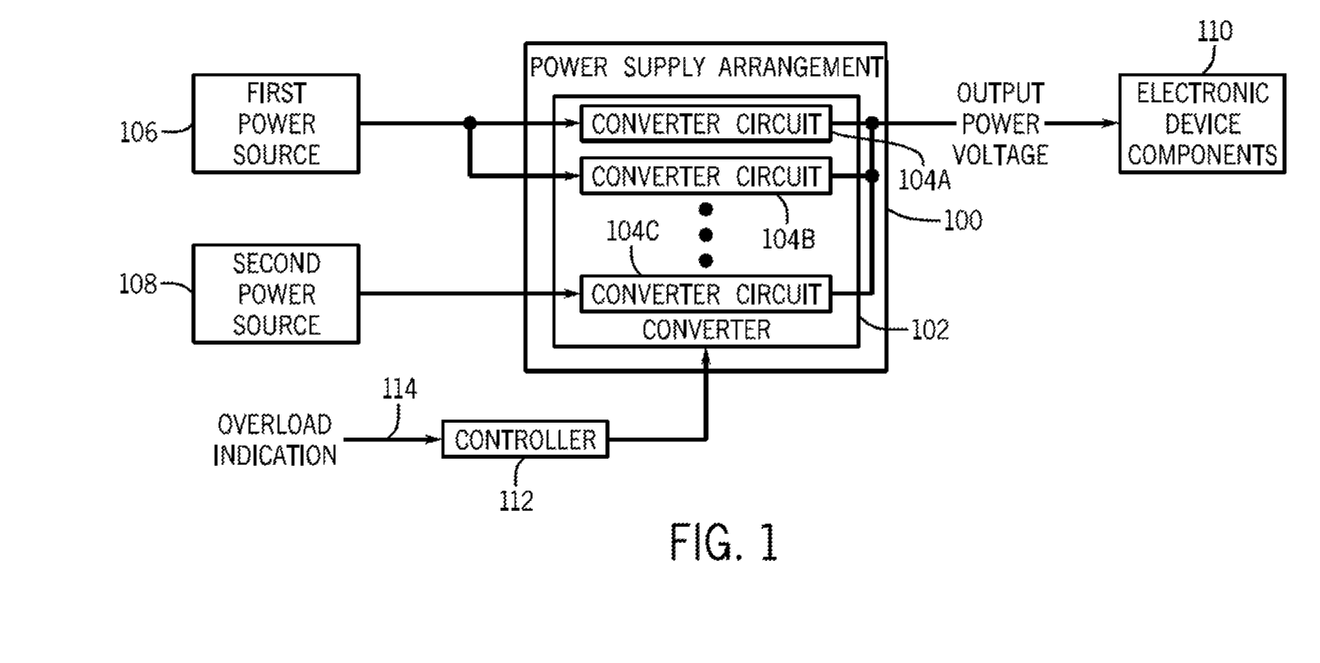
FIG. 1 is a block diagram of a power supply arrangement according to some implementations.

FIG. 1 depicts a power supply arrangement 100 according to some implementations that has a converter 102 having multiple converter circuits 104A, 104B, and 104C. The converter 102 is a multi-phase converter that has multiple phases including corresponding ones of the multiple converter circuits 104A, 104B, and 104C. Although three converter circuits (to provide three phases of the multi-phase converter 102) are depicted in FIG. 1, it is noted that the converter 102 can include just two converter circuits or more than three converter circuits. A "converter" refers to circuitry to convert an input voltage to an output voltage, where the input voltage and output voltage are often at different voltage levels (although in some cases the input and output voltages can be at the same voltage level). Each "converter circuit" in the converter 102 performs conversion between the respective input voltage to the output voltage. Each converter circuit of the converter is also considered to be a phase of the converter, where different phases can be activated at different times.

In the arrangement of FIG. 1, each of the converter circuits 104A, 104B has an input connected to a first power source 106, while the converter circuit 104C has an input connected to a second power source 108. A converter circuit can be connected directly to a respective power source or connected indirectly (through other circuits or devices) to the respective power source. Alternatively, just one converter circuit of the converter 102 is connected to the first power source 106, while multiple converter circuits of the converter 102 are connected to the second power source 108. As yet another alternative, multiple converter circuits of the converter 102 are connected to the first power source 106, and multiple converter circuits of the converter 102 are connected to the second power source 108. In other implementations, plural second power sources 108 can be provided, with respective converter circuits having inputs connected to corresponding ones of the second power sources 108.

The outputs of the converter circuits 104A, 104B, 104C provide an output power voltage that supplies power to electronic device components 110. Although just one output power voltage is depicted in FIG. 1, it is noted that the power supply arrangement 100 can also output additional output power voltage(s) in some implementations.

A controller 112 is associated with the converter 102 to control activation of the converter circuits 104A, 104B, 104C. In some implementations, the controller 112 is able to activate selected ones of the converter circuits 104A, 104B, 104C. The controller 112 receives an overload indication 114 for indicating whether or not the first power source 106 is in an overload condition. In some implementations, the overload indication 114 can also indicate a degree of the overload condition of the first power source 106.

The controller 112 can be implemented as a hardware device, such as an application-specific integrated circuit, microcontroller, programmable gate array, and so forth. Alternatively, the controller 112 can be implemented as a processor on which machine-readable instructions are executable.

The ensuing discussion assumes that both the first power source 106 and the second power source 108 are available. The first power source 106 can have two possible conditions: (1) a normal condition, in which the first power source 106 is not in an overload condition, and (2) an overload condition.

When the first power source 106 is in a normal condition, the controller 112 causes activation of a first set of the converter circuits that have inputs connected to the first power source 106, where the first set includes converter circuits 104A, 104B but not converter circuit 104C (all of the converter circuits in the first set have inputs connected to the first power source 106—in other words 104A and 104B and possibly more converter circuits but not 104C). On the other hand, when the controller 112 determines that the first power source 106 is in an overload condition (based on the overload indication 114), the controller 112 activates a second set of converter circuits, where the second set includes converter circuits 104A, 104B, and 104C (in some implementations, the second set can include converter circuits of the first set plus converter circuit 104C that has its input connected to the second power source 108). More generally, with the multi-phase converter 102, when the first power source 106 is in a normal condition, the phases (converter circuits) of the converter 102 that are activated are those phases powered by the first power source 106. However, when the first power source 106 is in an overload condition, at least one additional phase powered by the second power source 108 is activated, which in the converter 102 is the converter circuit 104C.

Figure 2A:
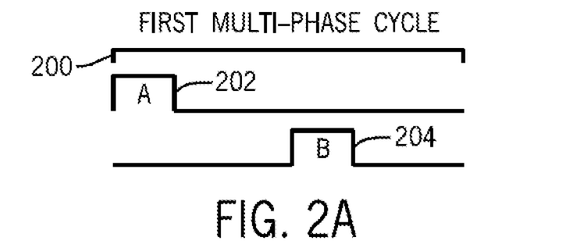
FIGS. 2A-2B illustrate different multi-phase cycles that can be used with the power supply arrangement according to some implementations.
Figure 2B:
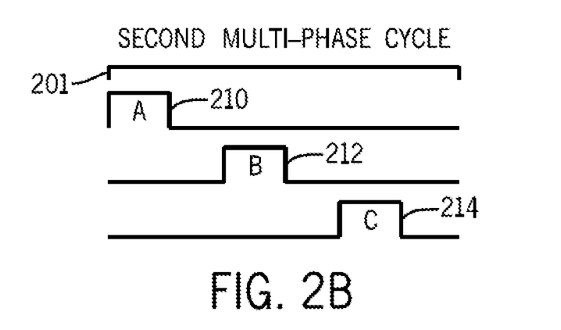

FIGS. 2A and 2B illustrate multi-phase cycles of the converter 102 under the normal condition and overload condition, respectively, in accordance with some examples. In other implementations, control of activation of the converter circuits of the converter 102 does not have to use the multi-phase cycles depicted in FIGS. 2A and 2B. In each of FIGS. 2A and 2B, the different converter circuits of the respective set (first set or second set) are controlled by the controller 112 such that the converter circuits within the respective set are operated out of phase—in other words, the converter circuits in each respective set draw or deliver current out of phase (by a fixed time offset) with respect to each other, in a synchronized manner. In alternative examples, out of phase operation of converter circuits in a cycle is not employed.

In the first multi-phase cycle depicted in FIG. 2A (active during a normal condition), the converter circuits 104A, 104B having inputs connected to the first power source 106 are activated to draw or deliver current (or power) 180° out of phase with respect to each other. In FIG. 2A, section 202 represents a time interval when the converter circuit 104A (but not the converter circuit 104B) is drawing or delivering current, while section 204 represents a time interval when the converter circuit 104B (but not the converter circuit 104A) is drawing or delivering current. The first multi-phase cycle has a cycle length indicated as 200. Within the first multi-phase cycle, both converter circuits 104A and 104B are on, but just one of the converter circuits 104A and 104B is drawing or delivering current (note that the converter circuit 104C connected to the second power source 108 is deactivated in the first multi-phase cycle). If there are more converter circuits connected to the first power source 106, then such additional converter circuits would also be part of the first multi-phase cycle within cycle length 200 (if there are more than two converter circuits, then the more than two converter circuits are activated to draw or deliver current at synchronized fixed offset with respect to each other, where the fixed offset varies according to the number of converter circuits in the cycle, e.g., 120° offset for three converter circuits, 90° offset for four converter circuits, and so forth).

In the second multi-phase cycle depicted in FIG. 2B (active during an overload condition), the converter circuit 104C (powered by the second power source) is activated in addition to the converter circuits 104A, 104B (powered by the first power source). The sections 210, 212, and 214 in FIG. 2B represent respective time intervals during which respective ones of the converter circuits 104A, 104B, and 104C are drawing or delivering current. The time intervals represented by sections 210, 212, and 214 are out-of-phase with respect to each other by 120°. In implementations with plural second power sources 108, plural converter circuits powered by the plural second power sources 108 can be activated in the second multi-phase cycle.

The duration of each section 202, 204 in FIG. 2A and the duration of each section 210, 212, 214 in FIG. 2B is a function of the input voltage (to the respective converter circuit) relative to the output voltage (from the respective converter circuit). In examples according to FIG. 2B, the duration of section 214 (when the converter circuit 104C is drawing or delivering current) is shown as generally the same as the duration of each of sections 210 and 212 (when the respective converter circuits 104A and 104B are drawing or delivering power), which assumes that the voltage from the second power source 108 is the same as the voltage from the first power source 106. In different examples, if the voltage from the second power source 108 is different from the voltage from the first power source 106, then the duration of section 214 would be different from the duration of each of sections 210 and 212.

In the foregoing discussion, it is assumed that all of the converter circuits 104A, 104B having inputs connected to the first power source 106 are activated as part of a particular multi-phase cycle (e.g., first or second multi-phase cycle discussed above). In alternative implementations, one or multiple ones of the converter circuits having inputs connected to the first power source 106 can be maintained deactivated in the particular multi-phase cycle. For example, in the arrangement shown in FIG. 1, the converter circuit 104B can be maintained in a deactivated state in the particular multi-phase cycle.

Also, although FIG. 1 depicts just one converter circuit 104C being activated in the second multi-phase cycle, alternative implementations can have multiple converter circuits with inputs connected to the second power source 108 that are activated in the second multi-phase cycle.

In the second multi-phase cycle, both converter circuit(s) having input(s) connected to the first power source 106 and converter circuit(s) having input(s) connected to the second power source 108 are activated. In this manner, the converter circuit(s) having input(s) connected to the second power source 108 can supplement the power provided to the output power voltage when the first power source 106 is in an overload condition.

Figure 3:
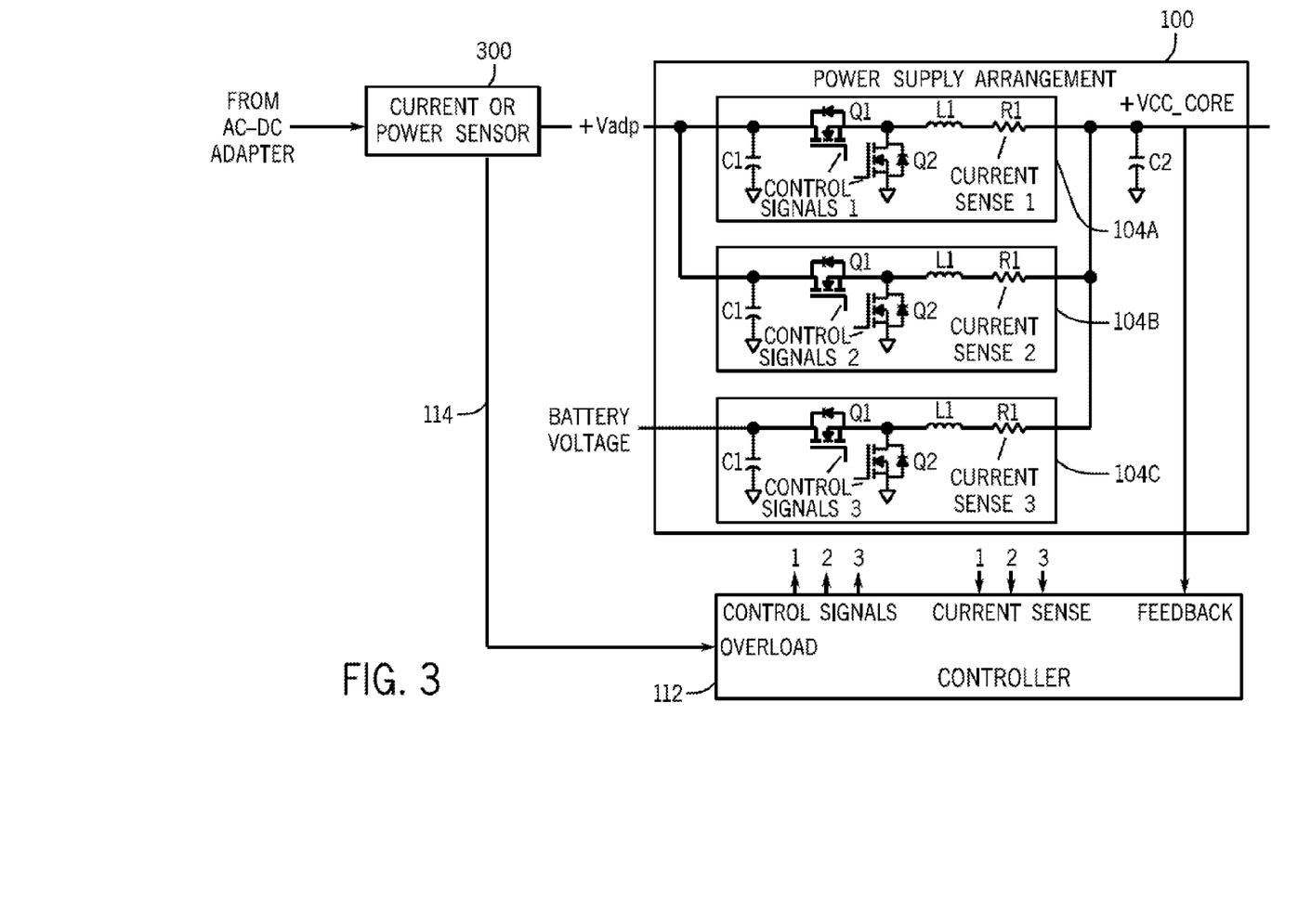
FIGS. 3 and 4 are schematic diagrams of further details of the power supply arrangement, according to various implementations.

FIG. 3 illustrates further details of converter circuits 104A, 104B, and 104C, according to some implementations. As shown in FIG. 3, the converter circuits 104A, 104B have inputs connected to +Vadp, which is a voltage produced from the output of an AC-DC adapter, according to some implementations. The converter circuit 104C has an input connected to a battery voltage. Each of the converter circuits 104A, 104B, 104C has a series transistor Q1 and a pull-down transistor Q2, controlled by respective control signals (output by the controller 112). Generally, Q1 and Q2 represent switches that can be selectively activated and deactivated to control the corresponding converter circuit.

The series transistor Q1 in each converter circuit is connected between the input of the converter circuit and one side of an inductor L1. The pull-down transistor Q2 is connected between a node connecting transistor Q1 and conductor L1, and ground. The other side of inductor L1 is connected to a current sense resistor R1. The arrangement of each converter circuit 104A, 104B, 104C is a buck converter arrangement with synchronous rectifier. The current sense resistors R1 in the respective converter circuits 104A, 104B, 104C produce current sense signals (current sense 1, current sense 2, current sense 3) that are provided as inputs to the controller 112. Other mechanisms of providing current sense signals can be used in other examples.

Each converter circuit 104A, 104B, 104C further includes a capacitor C1 connected between the input of the converter circuit and ground. The outputs of the converter circuits 104A, 104B, 104C are connected to an output power voltage, referred to as +Vcc_core in FIG. 3 (which provides a multi-phase buck converter). The output power voltage +Vcc_core is provided to power certain electronic device components. The output power voltage +Vcc_core is also provided as a feedback input to the controller 112.

The feedback of +Vcc_core to the controller 112 allows the controller 112 to regulate +Vcc_core at a target voltage, by adjusting control of the converter circuits 104A, 104B, 104C.

The current sense signals that are provided from the respective converter circuits 104A, 104B, and 104C, to the controller 112 allows the controller 112 to adjust the relative timings of the control signals (control signals 1, control signals 2, and control signals 3) to equalize the average current produced by the respective converter circuits.

In examples using the arrangement of FIG. 3, section 202 in FIG. 2A represents a time interval during which current is being drawn or delivered through transistor Q1 in the converter circuit 104A, and section 204 represents a time interval during which current is being drawn or delivered through transistor Q1 in the converter circuit 104B.

Similarly, section 210 in FIG. 2B represents a time interval during which current is being drawn or delivered through transistor Q1 in the converter circuit 104A, section 212 represents a time interval during which current is being drawn or delivered through transistor Q1 in the converter circuit 104B, and section 212 represents a time interval during which current is being drawn or delivered through transistor Q1 in the converter circuit 104C.

Although a specific design of converter circuits is shown in FIG. 3, it is noted that other designs of converter circuits can be employed in other implementations.

As further shown in FIG. 3, a current or power sensor 300 is provided to measure a current or power drawn from the AC-DC adapter. In some implementations, the current or power sensor 300 can be contained within the AC-DC adapter. In other implementations, the current or power sensor 300 can be external to the AC-DC adapter. The sensor 300 outputs the overload indication 114 that is provided to the controller 112. Based on the overload indication 114, the controller 112 can selectively activate the first multi-phase cycle or the second multi-phase cycle.

In a non-overload (normal) condition, the first multi-phase cycle is activated. In the first multi-phase cycle, the control signals 3 are set such that the converter circuit 104C is maintained inactive. Thus, in this normal condition, the controller 112 maintains the control signals 1 and 2 to operate corresponding converter circuits 104A, 104B according to the first multi-phase cycle, in some implementations.

When an overload condition is detected based on the overload indication 114 output by the current sensor 300, the controller 112 activates the second multi-phase cycle in which the control signals 1, 2, and 3 are maintained to operate the corresponding converter circuits 104A, 104B, and 104C.

In some implementations, the overload indication 114 can be an analog signal, such as a voltage signal. The voltage signal can have various continuous analog levels for indicating the degree of overload of the AC-DC adapter. The degree of overload would cause the controller 112 to adjust the control of the converter circuits 104A, 104B and the control of the converter circuit 104C. A high degree of overload would cause the converter circuit 104C to deliver a higher percentage of power relative to the power delivered by the converter circuits 104A, 104B in the second multi-phase cycle. On the other hand, a lower degree of overload would mean that the converter circuit 104C would deliver relatively less power in the second multi-phase cycle relative to the converter circuits 104A, 104B.

In alternative implementations, the overload indication can be a multi-value digital indication, which can provide the following indications: no overload, overload condition 1, overload condition 2, . . . . Overload condition 1 and overload condition 2 represent different degrees of overload of the AC-DC adapter.

In some implementations, the power delivered from the battery phase (converter circuit 104C) can be controlled by adding a bias to the signal current sense 3 (from resistor R1 in the converter circuit 104C). To provide no power from the converter circuit 104C (to draw no power from the battery), the added bias indicates to the controller 112 that the converter circuit 104C is already providing equal current as the other phases, so that the converter circuit 104C is not activated by the controller 112. However, in an overload condition, the bias is reduced so that the controller 112 allows current to flow from the converter circuit 104C to draw power from the battery. A larger overload condition results in a lower bias so that more current is drawn from the converter circuit 104C.

In other implementations, other techniques or mechanisms for controlling relative power delivered from the battery phase and non-battery phases can be used.

Figure 4:
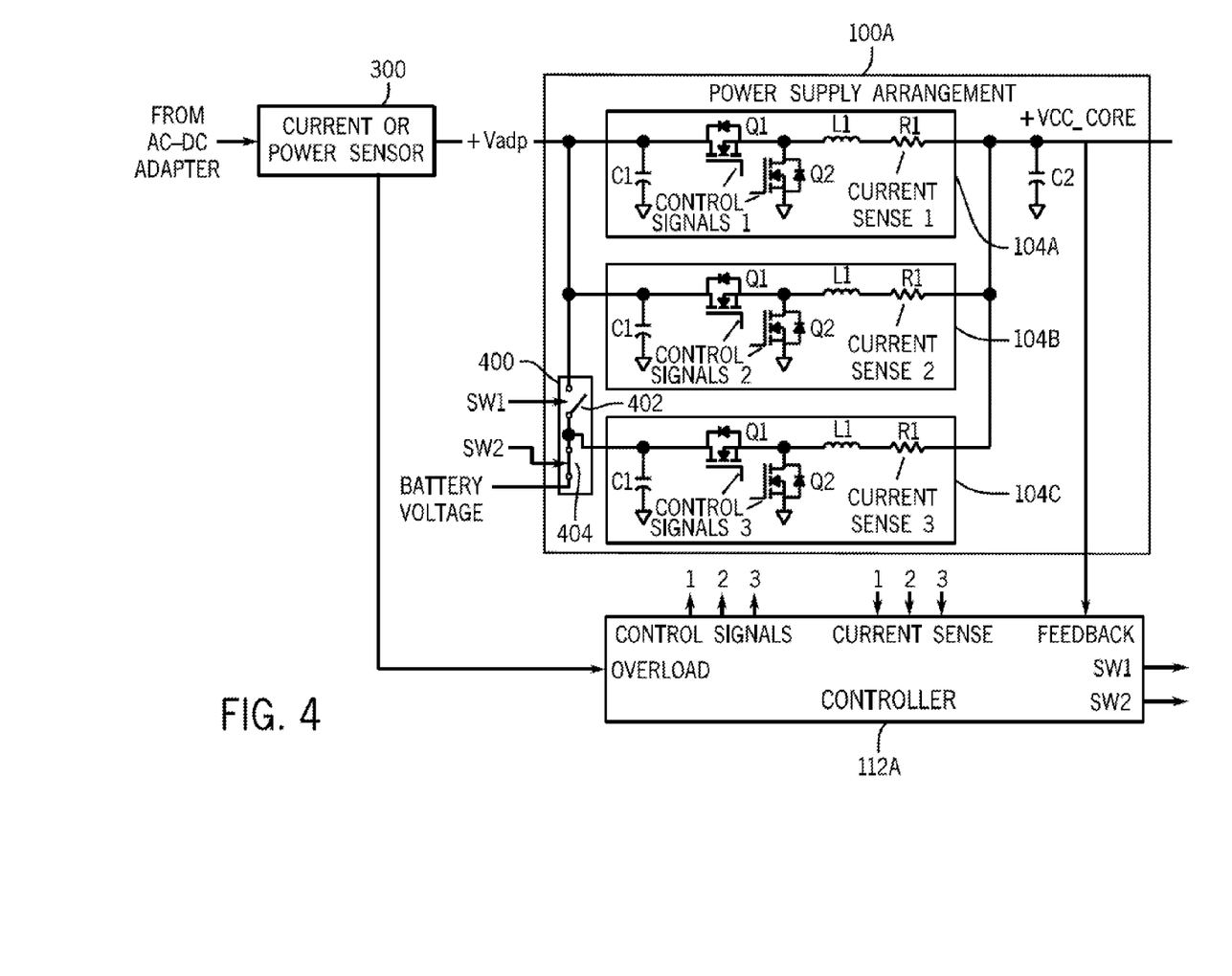

FIG. 4 illustrates alternative implementations of the power supply arrangement (100A). The arrangement 100A depicted in FIG. 4 is identical to the arrangement 100 of FIG. 3, except that a switch assembly 400 has been added to the FIG. 4 arrangement 100A. The components that are the same between FIGS. 3 and 4 share the same reference numerals. The switch assembly 400 has a first switch 402 and a second switch 404, where the first switch 402 is controlled by a control signal SW1, and the second switch 404 is controlled by a control signal SW2. The control signals SW1 and SW2 are output by a controller 112A, which is similar to the controller 112 of FIG. 3 except that the controller 112A also generates control signals SW1 and SW2.

The first switch 402 is used for connecting or disconnecting the input of the converter circuit 104C to the AC-DC adapter voltage +Vadp. The second switch 404 is used for connecting or disconnecting the input of the converter circuit 104C to the battery voltage. When the switch 402 is open, the switch 404 is closed, and when the switch 402 is closed, the switch 404 is open.

Under a normal condition, when the AC-DC adapter is not in an overload condition, the switch 402 is closed, while the switch 404 is open, to connect the input of the converter circuit 104C to +Vadp. During the normal condition, the controller 112 activates the signals gate drive 1, gate drive 2, and gate drive 3 in a first multi-phase cycle, in which successive ones of the converter circuits 104A, 104B 104C drive the +Vadp power to the output +Vcc_core.

However, in an overload condition of the AC-DC adapter, the controller 112 switches the states of control signals SW1 and SW2, to cause the switch 402 to be open, and the switch 404 to be closed. As a result, the input of the converter circuit 104C is connected to the battery voltage. In the overload condition of the AC-DC adapter, the controller 112 activates the second multi-phase cycle, in which the converter circuits 104A, 104B, and 104C are activated to couple selective ones of +Vadp and the battery voltage to +Vcc_core.

Figure 5:
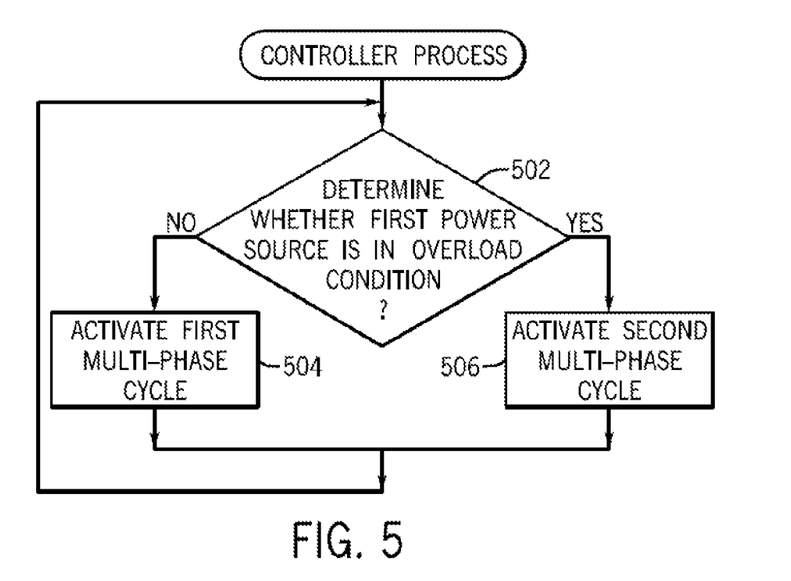
FIG. 5 is a flow diagram of a process of providing power to an electronic device, according to some implementations.

FIG. 5 is a flow diagram of a process performed by the controller 112 (or 112A) according to some implementations. The controller 112 determines (at 502) whether a first power source is in an overload condition. If not, the controller 112 activates (at 504) the first multi-phase cycle, in which the converter circuits that are activated are ones with inputs connected to the first power source.

However, if the controller 112 determines (at 502) that the first power source is in an overload condition, then the controller activates (at 506) the second multi-phase cycle, in which the second multi-phase cycle involves activating converter circuit(s) having input(s) connected to the first power source and converter circuit(s) having input(s) connected to the second power source.

Figure 6:
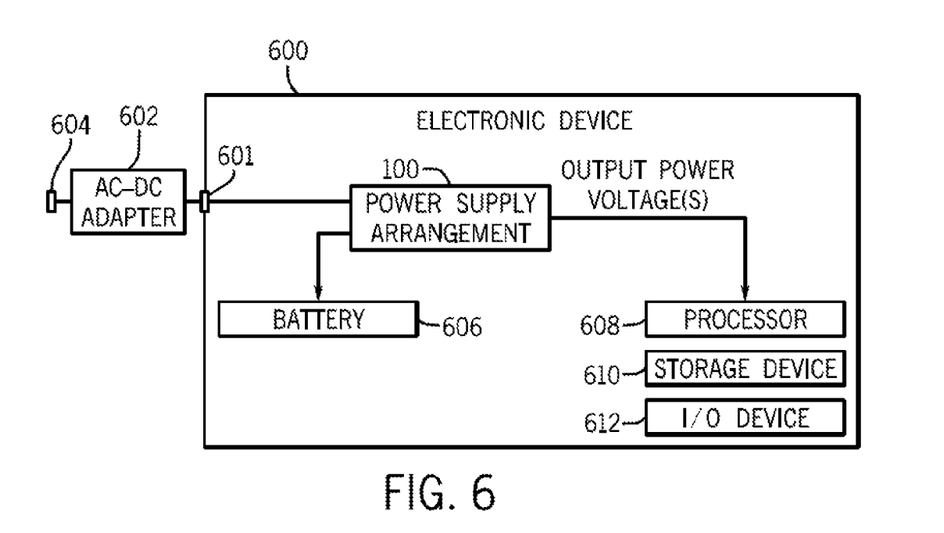
FIG. 6 is a block diagram of an electronic device that has a power supply arrangement according to some implementations.

FIG. 6 is a block diagram of an example system incorporating some implementations. An electronic device 600 has a power input 601 connected to an AC-DC adapter 602, which is connected to an AC outlet 604.

The power supply arrangement 100 or 100A according to some implementations is connected to the power input 601. The power supply arrangement 100 or 100A also is connected to a battery 606. The output power voltage(s) of the power supply arrangement 100 or 100A is(are) connected to various electronic device components, including a processor 608, a storage device 610, input/output (I/O) devices 612, and so forth.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. An apparatus to provide power to an electronic device, comprising:
    a plurality of converter circuits, wherein a first of the plurality of converter circuits has an input connected to a first power source, and a second of the plurality of converter circuits has an input connected to a second, different power source, and wherein the plurality of converter circuits provide a power voltage;
    a controller to:
    determine whether an overload condition of the first power source exists; and
    in response to determining that the overload condition exists, activate the first and second converter circuits; and
    a switch assembly to:
    connect the input of the second converter circuit to the second power source when the first power source is in the overload condition,
    disconnect the input of the second converter circuit from the second power source and connect the input of the second converter circuit to the first power source when the first power source is not in the overload condition, and
    control the switch assembly to selectively connect the input of the second converter circuit to the first power source or the second power source depending on whether the first power source is in the overload condition or not.

2. The apparatus of claim 1, wherein the controller is to further:
    in response to determining that the overload condition does not exist, control a subset of the plurality of converter circuits in a first multi-phase cycle in which successive ones of the converter circuits in the subset are controlled to draw current or deliver current out of phase with respect to each other, wherein the input of each of the converter circuits in the subset is connected to the first power source, wherein the subset includes the first converter circuit.

3. The apparatus of claim 2, wherein the controller is to control the converter circuits in the subset to draw current or deliver current a fixed time offset out of phase.

4. The apparatus of claim 2, wherein, in response to determining that the overload condition exists, the controller is to control the plurality of converter circuits including the subset of converter circuits and the second converter circuit in a second multi-phase cycle in which successive ones of the plurality of converter circuits are controlled to draw current or deliver current out of phase.

5. The apparatus of claim 1, wherein the controller is to further:
    in response to determining that the overload condition does not exist, maintain the second converter circuit deactivated.

6. The apparatus of claim 1, further comprising a current sensor to:
    detect whether the first power source is in the overload condition, and
    provide an indication to the controller regarding whether the first power source is in the overload condition.

7. The apparatus of claim 6, wherein the indication is an analog indication, and wherein the controller is to control an amount of power that the second converter circuit delivers based on a level of the analog indicator.

8. The apparatus of claim 6, wherein the indication is a digital indication that is able to indicate greater than two values corresponding to greater than two respective conditions of the first power source, and wherein the controller is to control an amount of power that the second converter circuit delivers based on the respective values of the digital indicator.

9. A method of providing power to an electronic device using a first power source and a second power source, comprising:
    Determining, by a controller, whether the first power source is in an overload condition;
    in response to determining that the first power source is not in an overload condition, activating, by the controller, converter circuits in a first multi-phase cycle, wherein all of the converter circuits activated in the first multi-phase cycle have inputs connected to the first power source; and
    in response to determining that the first power source is in the overload condition, activating by the controller, converter circuits in a second multi-phase cycle, wherein a particular one of the converter circuits that is activated in the second multi-phase cycle has an input connected to the second power source.

10. The method of claim 9, further comprising:
    adjusting, by the controller, power which the particular converter circuit delivers in the second multi-phase cycle based on a degree of the overload condition.

11. The method of claim 9, wherein one of the following is provided:
    deactivating the particular converter circuit during the first multi-phase cycle; and
    connecting the input of the particular converter circuit to the first power source instead of the second power source during the first multi-phase cycle.

12. The method of claim 9, wherein the electronic device has plural second power sources, and wherein the controller activating the converter circuits in the second multi-phase cycle comprises activating converter circuits having inputs connected to the second power sources.

13. An electronic device comprising:
    components to be powered by one or both of a first power source and a second, different power source;
    a sensor to detect an overload condition of the first power source;
    a power supply arrangement comprising:
    a plurality of converter circuits, wherein a first of the plurality of converter circuits has an input connected to the first power source, and a second of the plurality of converter circuits has an input connected to the second power source, each of the plurality of converter circuits having an output connected to a power voltage for provision to the components;
    a controller to:
    determine whether the overload condition of the first power source exists based on an overload indication from the sensor; and
    in response to determining that the overload condition exists, activate the first and second converter circuits as part of a multi-phase cycle of the plurality of converter circuits in which successive ones of the plurality of converter circuits are operated out of phase; and
    a switch assembly to:
    control the switch assembly to selectively connect the input of the second converter circuit to the first power source or the second power source depending on whether the first power source is in the overload condition or not.

* * * * *